July 21 1925.
J. R. KUHN
1,546,841
CONDENSING APPARATUS
Filed Dec. 5, 1921
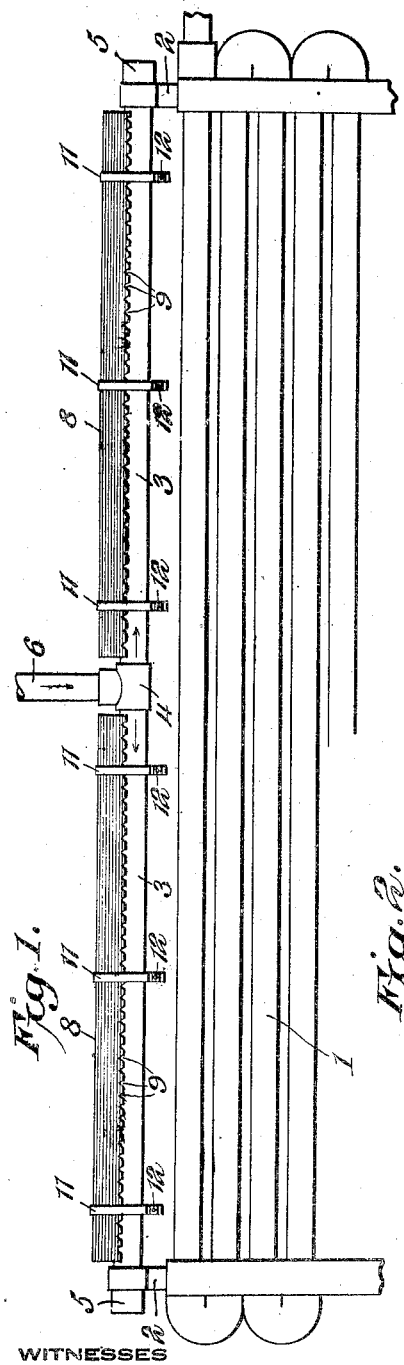
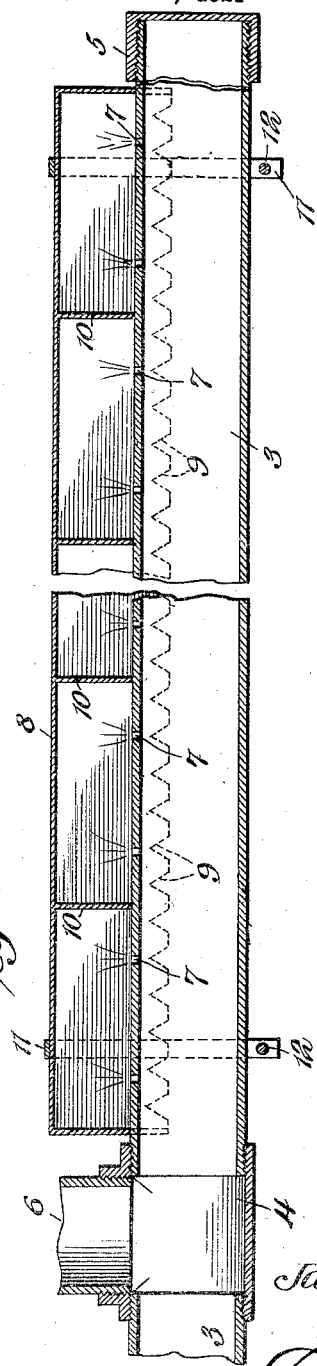
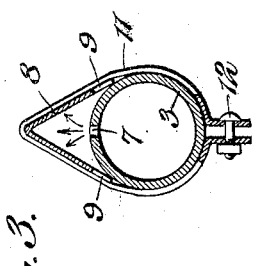
Jacob R. Kuhn,
INVENTOR,
WITNESSES
Howard D. Orr
F. T. Chapman
BY
E. G. Siggers
ATTORNEY Patented July 21, 1925.

1,546,841

UNITED STATES PATENT OFFICE.

JACOB R. KUHN, OF NEW CASTLE, PENNSYLVANIA.

CONDENSING APPARATUS.

Application filed December 5, 1921. Serial No. 520,079.

*To all whom it may concern:*

Be it known that I, JACOB R. KUHN, a citizen of the United States, residing at New Castle, in the county of Lawrence and State of Pennsylvania, have invented a new and useful Improvement in Condensing Apparatus, of which the following is a specification.

This invention has reference to condensing apparatus for chilling materials, and while not confined to any particular use, is intended more especially for chilling or condensing ammonia.

In ordinary ammonia systems of refrigeration, there is provided a coil of pipe of suitable length permitting the down flow of ammonia for cooling. The ammonia is directed to the upper portion of the coil of pipe to flow down through the coil, and the ammonia is subjected to the cooling action of numerous streams of a chilling medium, such as water, permitted to gravitate over the ammonia pipes from a high to a low point, so that the temperature of the ammonia is reduced by the effect of the chilling medium, as usual.

The arrangement is such that the chilling medium is widely and evenly distributed, while the structure is such as to admit of ready attachment to the ammonia coils without in any manner disturbing the latter, and no change is necessary in installed ammonia coils.

In accordance with this invention, provision is made for coupling a distributing device for the cooling water to a supply of water, having a deflector or baffle fastened on top of the water supply pipe, and the deflector or baffle has numerous vents between partitions, with the vents opening upwardly, so as to cause the water to impinge against upwardly approaching walls and escape from the baffle by way of many apertures at the sides of the pipe on which the distributing baffle is located and secured. The baffle is located over and above the ammonia coil to receive the cooling water by gravity, to flow down over the usual series of ammonia coils and so subject the coils to the cooling action of the gravitating water.

The baffle structure has end caps and intermediate plates to distribute and segregate the cooling water, so that its distribution is quite uniform and the cooling of the ammonia coils is correspondingly uniform.

The invention will be best understood from a consideration of the following detailed description, taken in conjunction with the accompanying drawing forming part of this specification, with the understanding, however, that the invention is not confined to any strict conformity with the showing of the drawing but may be changed and modified, so long as such changes and modifications mark no material departure from the salient features of the invention, as expressed in the appended claims.

In the drawing,

Figure 1 is an elevation of an ammonia or other coil, and a distributing device for carrying out the invention.

Figure 2 is a longitudinal vertical section of the structure of Figure 1.

Figure 3 is a cross section of the cooling or chilling structure of Figure 1.

In the drawing, there is shown a coil 1, such as is usually used in connection with ammonia coils, although it may be taken as typical of other coils where chilling is to take place, and for simplicity of description, such coil will be hereinafter referred to as an ammonia coil, although the invention may be employed in connection with other substances than ammonia.

At opposite ends, and at intermediate points, if necessary, there are erected upon the coil 1, posts 2, designed to support a pipe 3, usually though not necessarily, made up of ten foot sections, having an intermediate coupling 4, and at the outer ends closed by caps 5. The coupling 4 may be in the form of a T coupling, to which communicates a supply pipe 6, whereby water, or some other cooling material, may find its way into the pipe 3, being diverted through the coupling 4 toward each end of the pipe 3.

Through the top of the pipe 3, are numerous vents 7, of appropriate size, to permit streams of water to flow therethrough. Resting on top of the pipe 3 is a tapering shield or crown 8, rising to an appropriate height and covering the vents 7. The shield 8 tapers to a relatively sharp edge and is wide enough at the lower edge to rest upon and be supported by the pipe 3, in substantially tangential relation thereto on both sides of the pipe, while the lower or wider edge of the shield 8, is furnished with a longitudinal series of notches 9, preferably though not necessarily of V form. The notches 9 are cut back into the walls of the shield 8, so as to provide ready escape for water, which may enter the shield 8, through the vents 7, and gravitate from the shield by way of the notches 9. The shield forms what may be termed as a crowned duct for the water.

In order to control the distribution of water from the pipe 3 into and from the shield 8, said shield 8 is closed at each end, and contains numerous lateral partitions 10, acting after the manner of baffles, whereby the water entering the pipe 3 is caused to rise against the tapering inner walls of the shield 8, to be diverted toward the wider or basic edges of the shield 8 and be caused to flow downwardly about the outer surface of the pipe 3, and through the notches 9, and from the surface of said pipe 3, to the coil pipes 1 at a lower level. To render the structure rigid, an appropriate number of straps 11, are soldered or otherwise joined to the shield 8 and also joined together about the pipe 3, by bolts 12 or otherwise, although it is quite feasible to connect the straps together in encircling relation to the pipe 3 and to the shield 8, by solder.

What is claimed is:—

1. A device for cooling condensing coils, comprising a water pipe adapted to be located above the coil, a hood in the shape of an inverted V adapted to rest with its lower edges upon the water pipe, a series of clamping straps encircling the pipe and hood and clamping the same together, said hood having its ends closed and having edge notches in its base for permitting the escape of water to gravitate over the condensing coil, the pipe having a longitudinal row of vents through its upper surface beneath the hood to direct streams of water against the inclined sides of the hood and thence through the notches and about the water pipe.

2. An attachment for cooling condensing coils, comprising a water pipe adapted to be mounted on the coil and provided with a series of spaced perforations along its upper face, said pipe having closed ends and an intermediate supply pipe, and a detachable flared hood covering the upper side of the water pipe and closed at its ends, a series of clamping straps encircling the pipe and hood and clamping the same together, said hood being provided with a longitudinal series of edge openings to provide escape for the water about the exterior of the pipe, said hood being also provided with a plurality of transverse partitions to cause uniformity of distribution of the water about the water pipe and thence about the coil.

In testimony that I claim the foregoing as my own, I have hereto affixed my signature.

JACOB R. KUHN.